Patented Dec. 24, 1946

2,413,191

UNITED STATES PATENT OFFICE 2,413,191

MANUFACTURE OF METAL-FREE PHTHALOCYANINE COLORING MATTER

Fred Shank Palmer and Peter Frederick Gross, Woodstown, N. J., assignors to E. I. du Pont de Nemours & Company, Wilmington, Del., a corporation of Delaware No Drawing. Application February 22, 1945, Serial No. 579,322

5 Claims. (Cl. 260—314.5)

This invention relates to an improved process for the manufacture of phthalocyanine coloring matters. More particularly this invention deals with the manufacture of metal-free phthalocyanines.

It is an object of this invention to provide an improved commercial process for manufacturing metal-free phthalocyanines. It is a further object to provide an economical process for producing metal-free phthalocyanine directly from phthalonitrile without the necessity of producing or isolating any intermediate reaction products. Other and further important objects of this invention will appear as the description proceeds.

The heretofore suggested processes for making metal-free phthalocyanine involve either the conversion of phthalonitrile to such metal phthalocyanines as can be demetallized by suitable treatments, say with acids or alcohols, or the direct conversion of phthalonitrile under the influence of certain catalysts and reaction promoters, with or without solvents, at elevated temperatures to metal-free phthalocyanine. Both methods give a crude pigment which is contaminated with large amounts of impurities or by-products. While in the case of copper phthalocyanine, its formation by heating phthalonitrile with copper-yielding salts in inert, liquid or solid diluents gives in large scale manufacture a comparatively pure pigment, which is obtained in almost theoretical yield, all heretofore disclosed efforts to develop an equally satisfactory process for making the metal-free phthalocyanine from phthalonitrile at attractive cost and in reasonably good yields have been unsuccessful. The reason for this failure is the fact that the metal-free phthalocyanine formation is complicated by the following difficulties:

(1) In order to form metal-free phthalocyanine, 4 moles of phthalonitrile must be joined together under conditions where 2 atoms of hydrogen per mole of metal-free phthalocyanine must be supplied. The only sources of hydrogen for this reaction are either a very destructive (and uncontrollable) decomposition of the phthalonitrile itself or the use of a suitable hydrogen-yielding component which serves as catalyst or reaction promoter.

(2) All known methods for supplying this hydrogen in a form where it is available for the pigment formation, involve the use of a comparatively long heating time and of relatively high fusion temperatures, which are necessary to decompose the hydrogen-yielding compounds.

(3) The addition of strongly alkaline, alkali-metal salts of certain aliphatic alcohols and the selection of such catalysts as may be expected to suffer decomposition and effect a reducing action at the high fusing temperatures have been proposed in the prior art, but the best known combination of these reaction promoters gives not over approximately 60% of the theoretical yield of metal-free phthalocyanine.

(4) Unfortunately, phthalonitrile itself is not a stable compound which can be subjected to drastic reaction conditions, particularly to the influence of strong alkalies at high temperatures, without undergoing very undesirable side reactions. It was found, for instance, that phthalonitrile, when heated at about 200° C. in the presence of strong alkalies, polymerizes readily to form a trimeric compound of a probable structure, which may be designated as tri(o-cyanophenyl)-1,3,5-triazine. Once this compound is formed, it cannot be further converted to a useful phthalocyanine product, and it is very difficult to remove from the pigment.

(5) Metal-free phthalocyanine itself is not nearly as stable in concentrated sulfuric acid as is copper phthalocyanine, and when dissolved in concentrated sulfuric acid at temperatures above 20° C. it decomposes completely within a few hours. The crude pigment cannot therefore be readily purified by crystallization from sulfuric acid or by extracting the impurities or by-products from the pigment with mineral acids under drastic conditions. Also, for the same reason, the prior art method which involves the formation of certain unstable metal phthalocyanines such as disodium, tin, lead or magnesium phthalocyanines, followed by demetallization by treatment with strong sulfuric acid, is very unsatisfactory from a technical viewpoint.

(6) There has been a general belief in the art, based on experiments, that phthalonitrile and caustic alkalis cannot successfully be converted into phthalocyanine coloring matters. Thus, Linstead and Lowe reported in J. C. S., 1934, page 1022, that sodium hydroxide does not appear to react with phthalonitrile to produce a phthalocyanine derivative. More recently, the Eastman-Kodak Co. disclosed in "Synthetic Organic Chemicals," vol. 14, 1942, No. 2, page 3, that a considerable number of metals and metal derivatives were reacted with phthalonitrile in attempts to obtain phthalocyanines. Sodium hydroxide is listed among those chemicals which "do not react" with phthalonitrile to give a phthalocyanine derivative.

The best known method for making metal-free phthalocyanine involves the heating of sodium amylate with phthalonitrile as disclosed in U. S. P. 2,116,602. This patent states specifically (p. 1, line 36) that the reagents which were found of particular assistance have the one property in common of being alkali-reacting substances, but not of a degree to be caustic.

(7) The phthalocyanine synthesis is a highly exothermic reaction and cannot be controlled in large scale manufacture unless inert solvents or diluents are added to the reaction mass. French Patent No. 799,901 suggests the manufacture of metal-free phthalocyanine by heating phthalonitrile with sodium amylate in the presence of an inert solid diluent, followed by extraction of the crude bake with diluted hydrochloric acid. This process, however, was found by use to give an extremely impure product of too low yield to be considered as a practical manufacturing method.

We have now found that metal-free phthalocyanine may be successfully synthesized on a commercial scale, with a high degree of economy, if phthalonitrile and a caustic alkali are heated together in solid state in the presence of methyl-glucamine and in the presence of further, inert, water-soluble or insoluble solid diluents, while subjecting the entire mass to continuous attrition and mixing, for instance by the aid of a ball mill. If the solid diluent is water-soluble, it and the caustic alkali may be leached out of the final reaction mass by the aid of water or weak acid. If the alkali and solid diluent are water-insoluble, they may be left in the resulting product to act as a substratum for the color.

The surprising aspect of our invention is that under the conditions aforenoted, the caustic alkali, which may be solid NaOH, KOH, Ca(OH)$_2$, Na$_2$O or CaO influences the phthalonitrile to react readily but does not, as in the previous cases, lead to an undesirable trimeric by-product. Also, the product is essentially metal-free phthalocyanine, and requires no demetallization step as in some of the prior art processes. Further advantages of the process of this invention are the elimination of costly purification operations, and much improved tinctorial properties of the final pigment. A still further advantage is the elimination of fire and health hazards connected with the use of those organic solvents and alkali metals which heretofore were required for making metal-free phthalocyanine from phthalonitrile on a manufacturing scale.

The metal-glucamine apparently acts as a source of hydrogen, by decomposition. It also has, however, an unexplained specific effect in promoting the reaction, permitting it in fact to proceed at a much lower temperature than otherwise necessary and insuring a good yield of a high quality product.

We have found that methyl-glucamine is much more effective in the above respect than any of the heretofore described catalysts, when used in combination with comparatively small amounts of caustic alkalies, such as sodium hydroxide, sodium oxide, calcium oxide, or calcium hydroxide. We have found that this combination of the new catalyst and heretofore disclosed, but unsuccessful reaction promoters is so much more effective than any other known catalyst or combination of catalysts, that this invention has now made it possible to manufacture metal-free phthalocyanine from phthalonitrile by employing a highly concentrated "dry bake," using a very moderate amount of an inert solid diluent to temper the violence of the reaction. We have furthermore found that the crude pigment as obtained by heating the above-indicated mixture of phthalonitrile, methyl-glucamine, a solid diluent, and a caustic alkali under anhydrous conditions at 160 to 220° C. under constant grinding and mixing conditions in a rotary baker, is sufficiently pure to be finished successfully for use as a 100% pigment toner, by a simple extraction of the water-soluble ingredients followed by the usual acid-pasting of the pigment from concentrated sulfuric acid below 20° C., without the use of any organic solvents or complicated purification treatment.

If the pigment is to be used for paints, our invention makes it possible to utilize the crude baked powder directly (i. e., without any extraction or purification treatment) for incorporation in the paint vehicle, provided that a common paint extender or a suitable substratum, is used as diluent in the bake in place of the water-soluble diluents.

The apparatus which is an essential part for making metal-free phthalocyanine according to this invention, may be a heated ball mill or rotary type reactor which allows an intimate grinding and mixing of all ingredients during all stages of the reaction, starting from a dry premix and passing through a semifused mass of a "sticky" nature until finally after the pigment formation is completed, the reaction mixture on cooling becomes a dry powder which can be discharged very readily from the ball mill or rotary baker. It was found that practically no pigment is formed when the same ingredients are heated in a "stationary" type bake.

A very suitable apparatus which can be used to advantage for this reaction, has been described in U. S. P. 2,153,300 (Dahlen and Detrick) for making phthalonitrile-cuprous-chloride-sodium-chloride or sodium-sulfate bakes to form copper phthalocyanine. When sodium hydroxide or sodium oxide is used in the bake in accordance with this invention, the equipment should be constructed of non-corrosive material such as nickel. However, we have made the surprising discovery that, when calcium hydroxide or calcium oxide is used, the material of construction for the baker may be ordinary iron. This effect is particularly surprising, since iron equipment is detrimental to the shade of the color in the heretofore known sodium amylate process and also in those modifications of our present invention where sodium hydroxide is used as the alkali. The theoretical reason for this difference is not entirely clear to us.

The amount of methyl-glucamine needed for the purpose of this invention is not very critical, provided that at least 0.03 part per part of phthalonitrile is used. It is not desired, however, to use more than approximately 0.07 part per part of phthalonitrile since an excess of methyl-glucamine over that required as catalyst, is likely to be converted under the baking conditions at high temperatures to degradation products which are difficult to remove from the pigment.

The amount of the caustic alkali to be used varies from a minimum of about 0.03 part per part of phthalonitrile, to as much as 0.1 part per part phthalonitrile, depending upon whether sodium hydroxide (or sodium oxide), or calcium oxide (or calcium hydroxide) is employed. Our experiments indicate that finely divided calcium hydroxide is the most effective of the above-listed alkalies since a minimum amount of it (0.03 part per part phthalonitrile) is sufficient to give optimum yield and quality of the pigment. In case of using sodium hydroxide, sodium oxide, or calcium oxide, we prefer to use about 0.05 to 0.1 part per part of phthalonitrile. Larger amounts are permissible; however, they are not necessary and are undesirable since they complicate the isolation and purification of the pigment.

The amount of solid diluent which should be used to temper the violence of the reaction, may be varied from a minimum of 0.5 part per part phthalonitrile to as much as 5 or more parts. We prefer to use about one part per part of phthalonitrile since less than 1 part may not be sufficient to allow the reaction to be carried out without danger of over-heating in large scale equipment, while the use of greater amounts renders the process less economic since it decreases the output of pigment from a given unit. Instead of using sodium chloride or sodium sulfate, other inert, water-soluble salts such as potassium chloride, potassium sulfate, etc., may be used.

If the pigment is intended for use in commercial paints, we prefer to use in place of a water-soluble salt, a common paint extender which remains with the pigment. In this case any amount from 1 to 5 or more parts of said extender or substratum may be used. For paint uses, we also prefer to employ calcium oxide or calcium hydroxide as the alkali, since in the course of the reaction these calcium salts are converted readily to calcium carbonate which is a common paint extender and can therefore be left in the pigment.

The temperature at which the reaction according to our invention is carried out, should be so chosen as to complete the reaction within a reasonable time at the lowest possible temperature. It was found desirable to heat the ingredients prior to the pigment formation for some time (1 to 2 hours) at about 150 to 170° C., followed by further heating at approximately 210 to 240° C. to complete the reaction.

The following examples in which parts by weight are given will serve to illustrate our invention in its preferred embodiments, without, however, any intent to limit the same.

*Example 1*

An intimately ground mixture consisting of 100 parts of dry phthalonitrile, 3 parts calcium hydroxide, 100 parts sodium sulfate or sodium chloride, and 6 parts methyl-glucamine is prepared by milling these dry materials together in a separate ball mill or in the same rotary baker containing metal rods or balls, where the fusion is to be made. To insure a uniform mixture, the grinding is continued at room temperature for 12 to 16 hours. The baker containing this premix is then heated to 160° C. and held at that temperature for 2 hours after which the temperature is raised to 215° C. and maintained for 6 hours. The heat is then turned off and the charge is allowed to cool to room temperature over a period of 6 hours during which time rotation of the baker is continued in order to pulverize the product. The resulting crude pigment may then be finished by one of the extraction and acid pasting methods disclosed in the art.

Thus, if sodium sulfate has been used as the diluent, the crude bake may be dissolved directly in cold concentrated sulfuric acid and the finished pigment recovered by drowning this acid solution in a large volume of water and subsequent filtration and washing of the filter cake with water until free of inorganic salts and water-soluble by-products. Because of its low concentration, the calcium sulfate formed is also removed by this procedure.

If sodium chloride has been employed as the diluent, the crude product may be extracted with diluted hydrochloric acid to remove the salts and some organic impurities and, after the usual filtration, washing and drying, the extracted pigment may be subjected to acid pasting by the aid of sulfuric acid as outlined above.

By this process, yields of purified metal-free phthalocyanine pigment amounting to over 80% of theory (based on the phthalonitrile employed) are obtained. Because of its higher state of purity, the pigment made by this process, exhibits much superior tinctorial properties in printing inks, paints and other pigment media as compared with the products obtained by heretofore disclosed processes.

*Example 2*

An intimately ground mixture consisting of 100 parts of dry phthalonitrile, 300 parts of titanium dioxide, 10 parts of calcium oxide, and 6 parts of methyl-glucamine is heated in a rotary baker under constant grinding and mixing conditions for 2 hours at 160 to 170° C. and then for another 4 hours at 215 to 220° C. The charge is then allowed to cool, while rotating the baker, to room temperature and the finely ground greenish-blue powder is discharged from the baker. The crude product thus obtained gives, without any further finishing treatment, very attractive greenish-blue shades of excellent durability, when incorporated in commercial paint vehicles.

*Example 3*

A mixture of 100 parts of phthalonitrile, 360 parts of aluminum hydrate, 3 parts of methyl-glucamine and 7 parts of sodium oxide is heated in a rotary baker, constructed of Monel metal, under constant grinding and mixing conditions for 6 hours at 210–220° C. After cooling the product is extracted with 5 parts of 3% sodium hydroxide at 70° C. for one hour, the pigment is filtered off and the cake is washed free of alkali and dried. The product thus obtained is a greenish-blue powder which can be used without further finishing treatment as an attractive pigment for paints.

*Example 4*

A mixture of 100 parts of the violet dioxazine pigment which is made from chloranil and beta-naphthylamine (described in British Patent 8,886 of 1912), 430 parts of phthalonitrile, 1200 parts of titanium dioxide, 25 parts of methyl-glucamine and 43 parts of calcium oxide is heated in a rotary baker for 2 hours at 150° C. and then for four hours at 210–220° C. The product thus obtained is a reddish-blue pigment suitable for use in paints.

*Example 5*

A mixture of 100 parts of 4-nitro-phthalonitrile, 200 parts of dry sodium chloride, 6 parts of methyl-glucamine and 10 parts of calcium oxide is heated in a rotary baker for 2 hours at 150° C. and then for 4 hours at 210–220° C. After cooling the product is discharged from the baker as a bluish-green powder which is extracted with 7 parts of a 2% hydrochloric acid solution at 70° C. for 1 hour. The filter cake is washed free of salt and dried. The crude product thus obtained is a nitro-metal-free phthalocyanine compound containing, according to analysis, 3.2 nitro groups phthalocyanine molecule. The product is obtained in a yield of approximately 80% of theory.

When, in a similar experiment, 5 parts of sodium oxide were used in place of 10 parts of calcium oxide, a product containing only 3.0 nitro groups per molecule was obtained in a yield of 77% of theory.

In the above examples, instead of using calcium hydroxide, or a somewhat greater amount of calcium oxide, similar amounts of anhydrous caustic soda, caustic potash or sodium oxide ($Na_2O$) may be employed, provided that a nickel rotary baker is used. In such event, the extraction of the crude product may be effected simply by hot water.

In our preferred practice, we employ the caustic alkali in quantities of the order of 0.25 mole of alkali per 4 moles of phthalonitrile. However, larger amounts may be used up to 1 mole of CaO (or 2 moles of NaOH) per 4 moles of phthalonitrile, i. e., approaching the chemically equivalent quantity for forming the corresponding metal phthalocyanines. There is, however, not the slightest evidence that the reaction actually proceeds through the intermediate formation of a metal phthalocyanine, and we do not wish to limit our invention to such hypothesis.

As pointed out above, there is a very considerable variety of water-soluble or water-insoluble diluents which can be used to temper the violence of the reaction, or to achieve the above and also serve as a sub-stratum for the crude pigment to be used for certain pigmentation purposes. Any heat-stable, water-soluble or water-insoluble product which does not interfere with the reaction, may be chosen as diluent. Among the extenders or substrata that were successfully used by us, the following may be mentioned: titanium dioxide, blanc fixe, barytes, lithopone, whiting ($CaCO_3$), zinc oxide, Timonox (antimony oxide), asbestine, aluminum hydrate, and heat-stable colored pigments, including the violet dioxazine pigment which is made from chloranil and beta-naphthylamine as described in British Patent 8,886 of 1912.

The temperature at which the reaction is carried out is preferably kept as low as possible, to avoid excessive decomposition of the initial materials or pigment formed. For this purpose, the reaction is preferably divided into two heating stages. The first stage involves heating at comparatively moderate temperature (140–170° C.), at which no metal phthalocyanine formation can be observed, but wherein the phthalonitrile is in a molten stage and a chemical reaction of an unknown nature appears to take place. In the second stage, the reaction mass is heated to temperatures above 170° C., to complete the reaction. Temperatures of 220 to 240° C., or even higher, are permissible at this point, provided that conditions are chosen where the reaction, which is highly exothermic, can be controlled to remain below 300° C. At temperatures above 300° C. gross decomposition and spontaneous ignition of the bake may take place.

It is essential that very good grinding and mixing of all ingredients be maintained throughout both heating periods since otherwise stratification of the reactants, and separation of the molten phthalonitrile from the other ingredients, will take place resulting in low yield and inferior quality of the pigment. As mentioned above, the reaction mass is in a semi-solid or highly viscous condition during certain stages of the process, prior to the completion of the pigment formation. It is very essential that good mixing conditions be employed during these stages. It is expedient also to continue the grinding of the baked material while the charge is being cooled, to obtain a powder which can be discharged readily.

Instead of a heated ball mill or rotary baker for the reaction, any other apparatus may be used provided it is equipped for heating in the first place, and for mechanical grinding, attrition and mixing of the materials in solid or pasty form, in the second place.

Numerous other variations in details will be apparent to those skilled in this art.

We claim as our invention:

1. A process for preparing a metal-free phthalocyanine coloring matter, which comprises heating together an arylorthodinitrile selected from the group consisting of phthalonitrile and nitro phthalonitrile and a solid, inert diluent in the presence of methyl-glucamine and a solid alkaline reagent selected from the group consisting of the oxides and hydroxides of the alkali-metals and of the alkaline-earth metals, while continually subjecting the mixture to attrition and mixing by the aid of mechanical grinding.

2. A process for preparing a metal-free phthalocyanine coloring matter, which comprises heating together phthalonitrile and a solid, inert diluent in the presence of methyl-glucamine and a solid alkaline reagent selected from the group consisting of the oxides and hydroxides of the alkali-metals and of the alkaline-earth metals, while continually subjecting the mixture to attrition and mixing by the aid of mechanical grinding.

3. A process for preparing metal-free phthalocyanine color, which comprises heating together phthalonitrile and a water-soluble, inert, solid diluent in the presence of methyl-glucamine and a water-soluble, solid alkaline reagent selected from the group consisting of the oxides and hydroxides of the alkali-metals and of the alkaline-earth metals, while continually subjecting the mixture to attrition and mixing by the aid of mechanical grinding, and eventually separating the color from the water-soluble constituents of the reaction mass.

4. A process of preparing a metal-free phthalocyanine coloring matter, which comprises heating together phthalonitrile and a solid, inert diluent in the presence of methyl-glucamine and a solid, alkaline agent selected from the group consisting of the oxides and hydroxides of the alkali-metals and of the alkaline-earth metals, the heating being carried out at a temperature above the melting point of phthalonitrile but below 300° C., and the reaction mass being continually subjected to attrition and mixing by the aid of mechanical grinding.

5. A process as in claim 4, wherein the alkaline agent employed corresponds in quantity to between $\frac{1}{16}$ and $\frac{1}{2}$ alkaline equivalents per mole of phthalonitrile employed.

FRED SHANK PALMER.
PETER FREDERICK GROSS.